Figure 1:
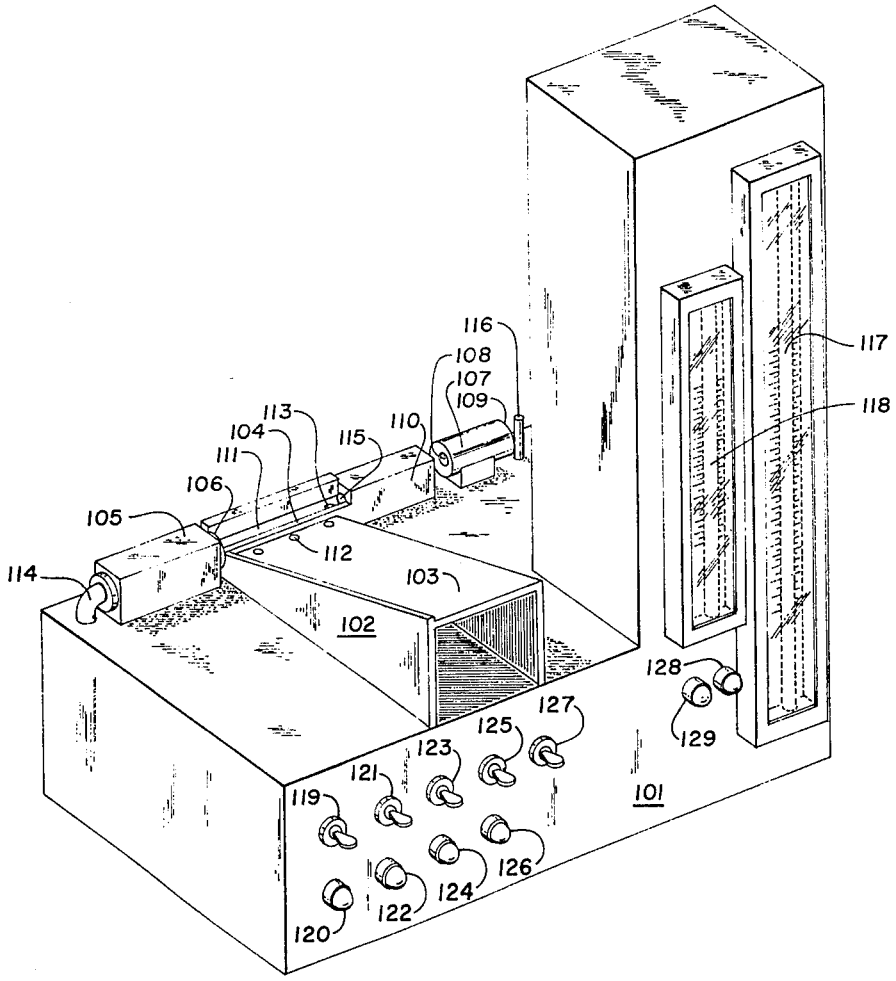
Figure 2:
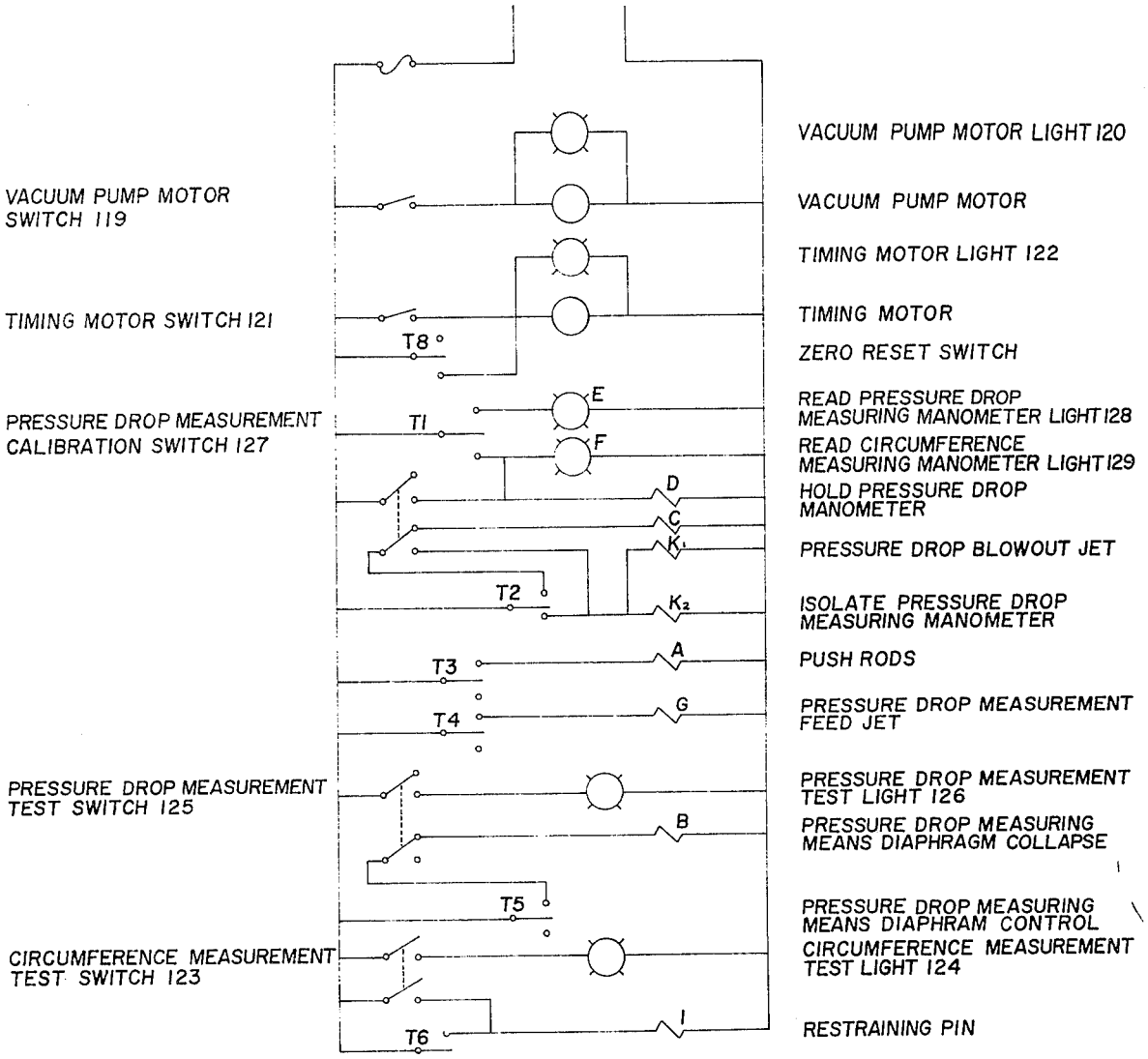
Figure 3:
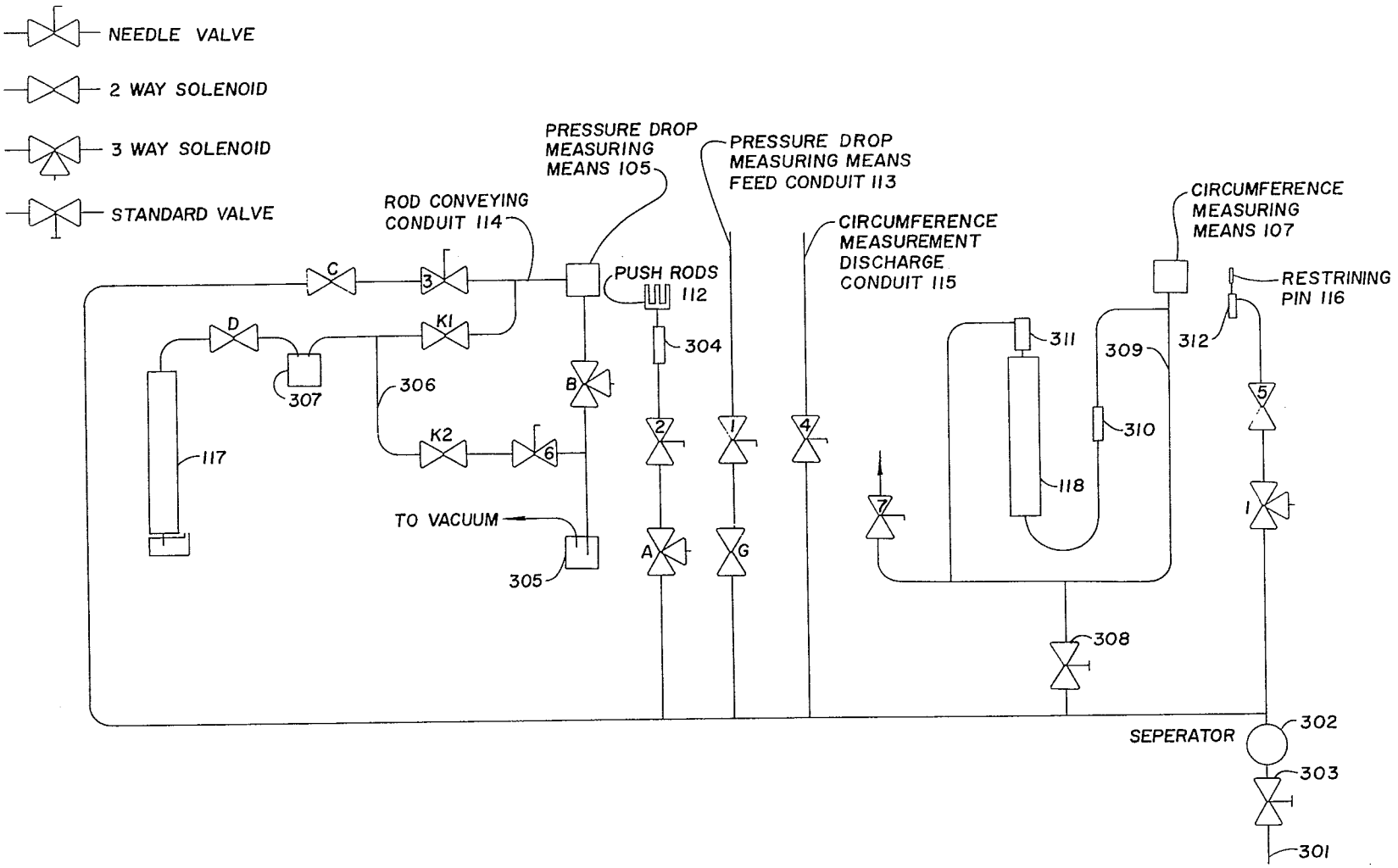
Figure 4:
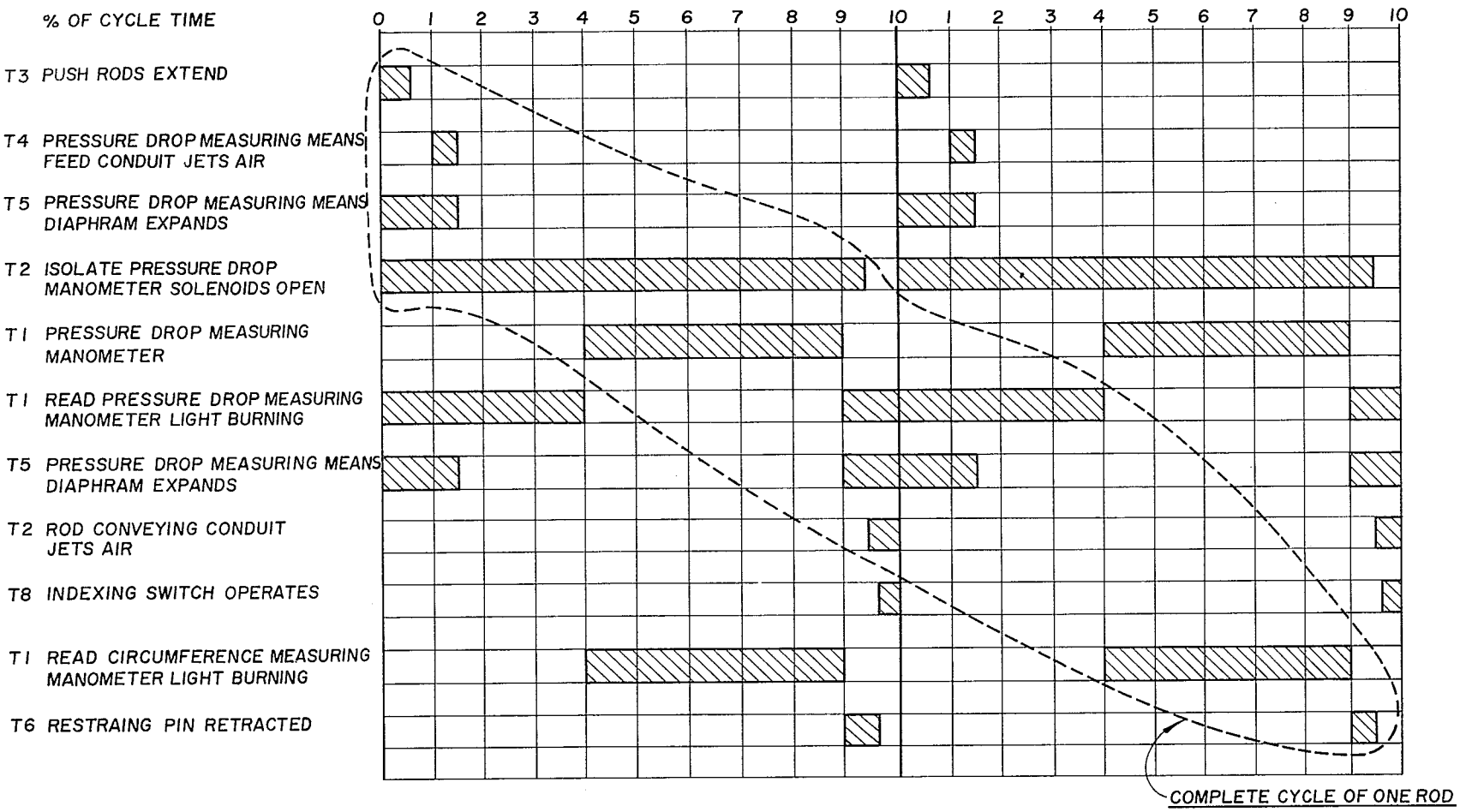

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED SEPTEMBER 2, 1975

938 O.G. 9

T938,010

METHOD AND APPARATUS FOR AUTOMATICALLY AND CONTINUOUSLY DETERMINING THE CIRCUMFERENCE AND PRESSURE DROP OF A TOBACCO SMOKE FILTER ROD PREFERABLY OF CELLULOSE ACETATE FIBER

Robert G. Wrye, Rte. 13, 4503 Grace Drive, Kingsport, Tenn. 37664

Continuation of application Ser. No. 399,032, Sept. 20, 1973, which is a continuation of application Ser. No. 290,295, Sept. 19, 1972, now abandoned. This application Aug. 22, 1974, Ser. No. 499,749

Int. Cl. G01b *13/08;* G01n *15/08*

U.S. Cl. 73—37.5

4 Sheets Drawing. 13 Pages Specification

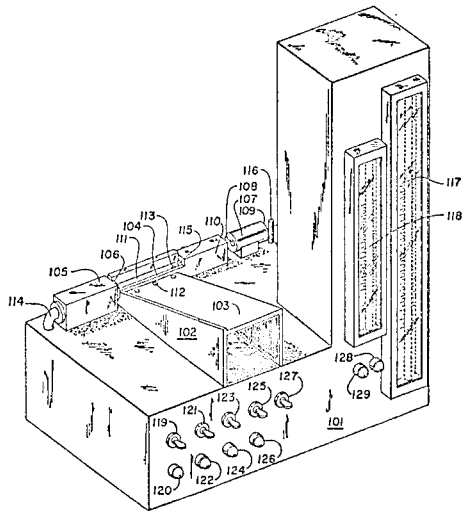

Disclosed is a method and apparatus for automatically and continuously measuring the circumference and pressure drop of a tobacco smoke filter rod preferably composed of cellulose acetate fiber. In this invention a plurality of tobacco smoke filter rods of cellulose acetate fiber are stored in a storage location and subsequently automatically transported from the storage location to a pressure drop measuring zone wherein the pressure drop of the rod is automatically measured. The rod is then automatically transported to a circumference measuring zone wherein the circumference is automatically measured. The rod is then automatically transported away from the circumference measuring zone. The method and apparatus of this invention advantageously reduces the time necessary to conduct similar measurements using conventional pressure drop and circumference measuring equipment that is not automatic and continuous in character.

METHOD AND APPARATUS FOR AUTOMATICALLY AND CONTINUOUSLY DETERMINING THE CIRCUMFERENCE AND PRESSURE DROP OF A TOBACCO SMOKE FILTER ROD PREFERABLY COMPOSED OF CELLULOSE ACETATE FIBER

Original Filed Sept. 19, 1972 4 Sheets-Sheet 1

METHOD AND APPARATUS FOR AUTOMATICALLY AND CONTINUOUSLY DETERMINING THE CIRCUMFERENCE AND PRESSURE DROP OF A TOBACCO SMOKE FILTER ROD PREFERABLY COMPOSED OF CELLULOSE ACETATE FIBER

Original Filed Sept. 19, 1972 4 Sheets-Sheet 2

METHOD AND APPARATUS FOR AUTOMATICALLY AND CONTINUOUSLY DETERMINING THE CIRCUMFERENCE AND PRESSURE DROP OF A TOBACCO SMOKE FILTER ROD PREFERABLY COMPOSED OF CELLULOSE ACETATE FIBER

Original Filed Sept. 19, 1972 4 Sheets-Sheet 3

METHOD AND APPARATUS FOR AUTOMATICALLY AND CONTINUOUSLY DETERMINING THE CIRCUMFERENCE AND PRESSURE DROP OF A TOBACCO SMOKE FILTER ROD PREFERABLY COMPOSED OF CELLULOSE ACETATE FIBER

Original Filed Sept. 19, 1972 4 Sheets-Sheet 4